UNITED STATES PATENT OFFICE.

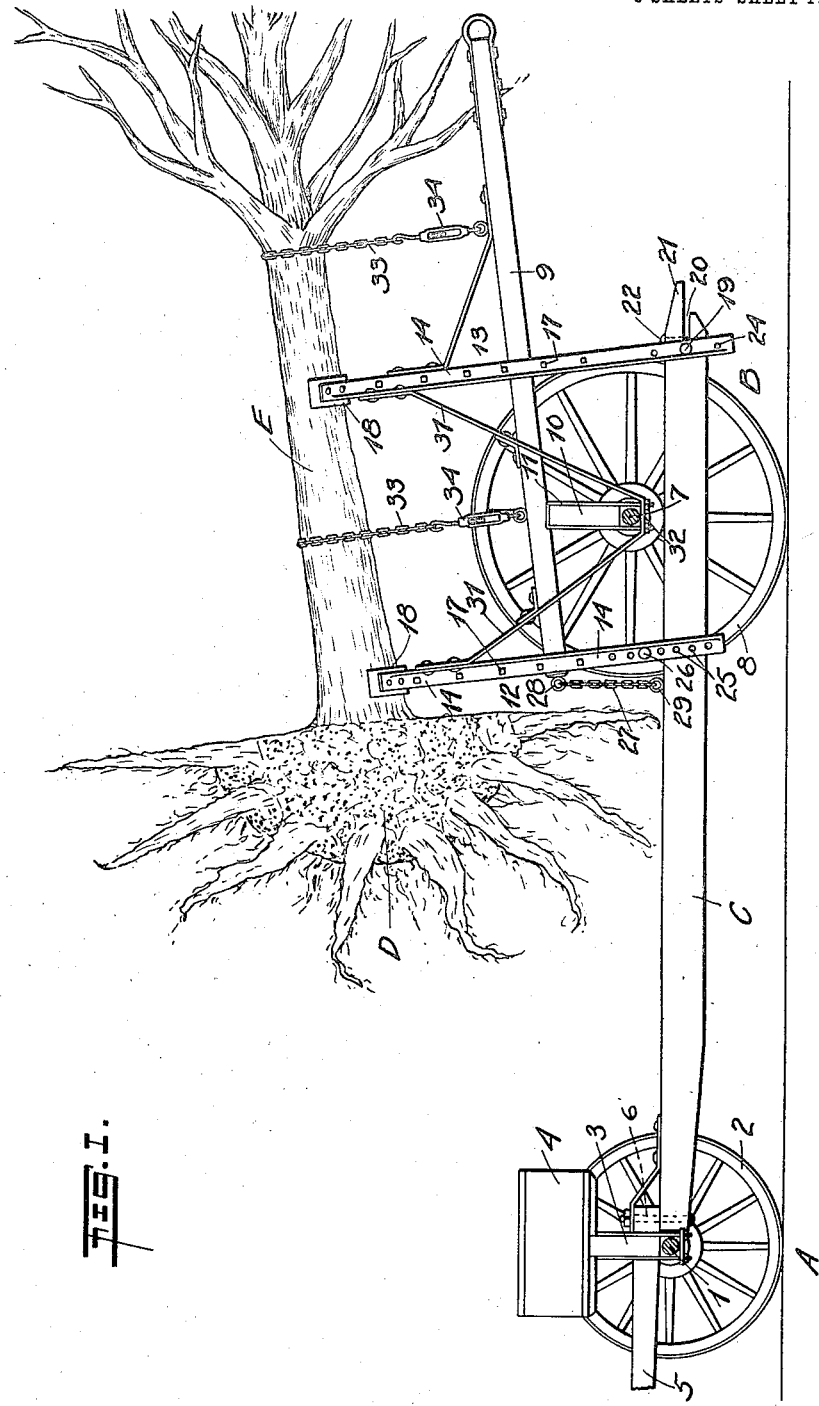

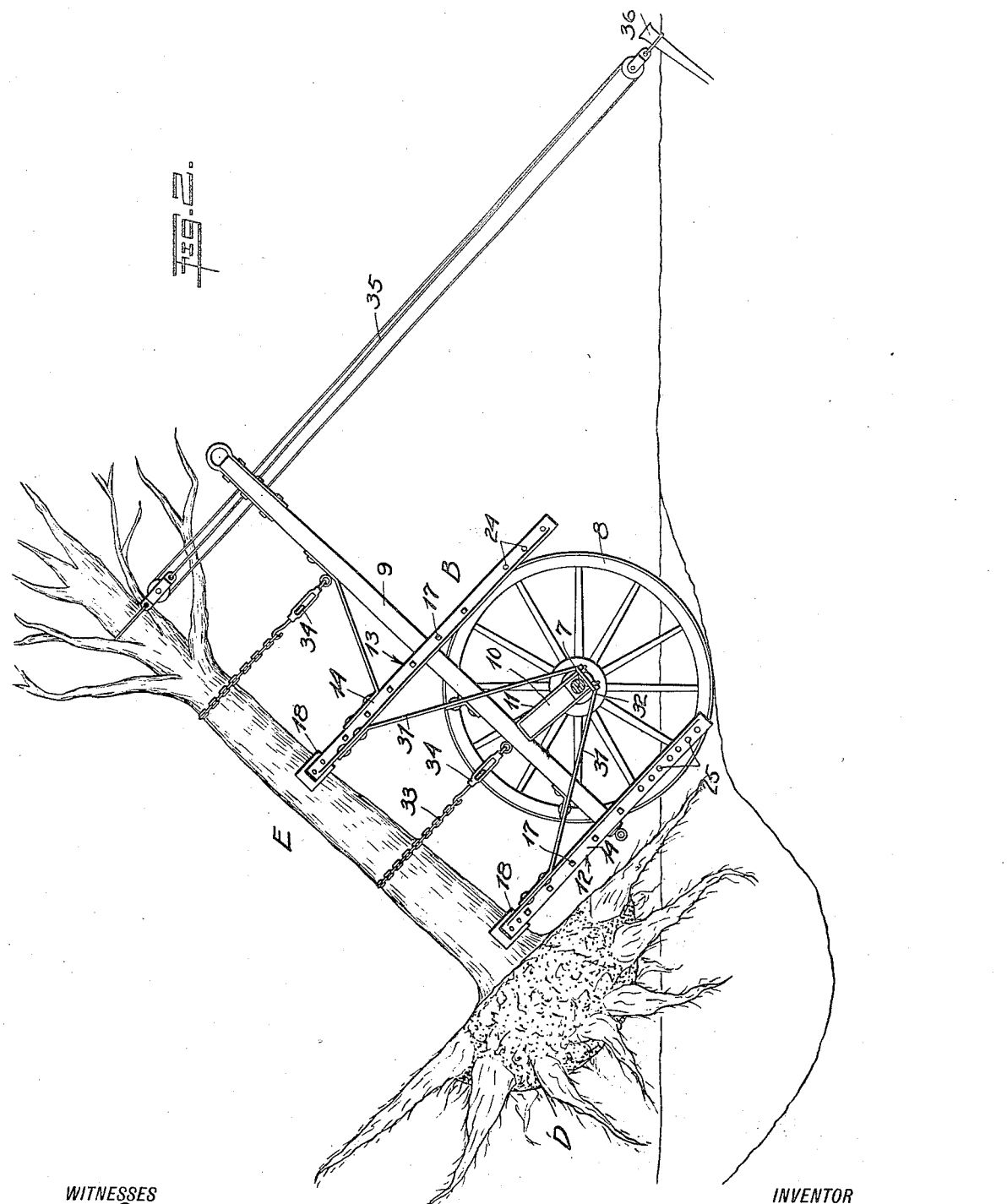

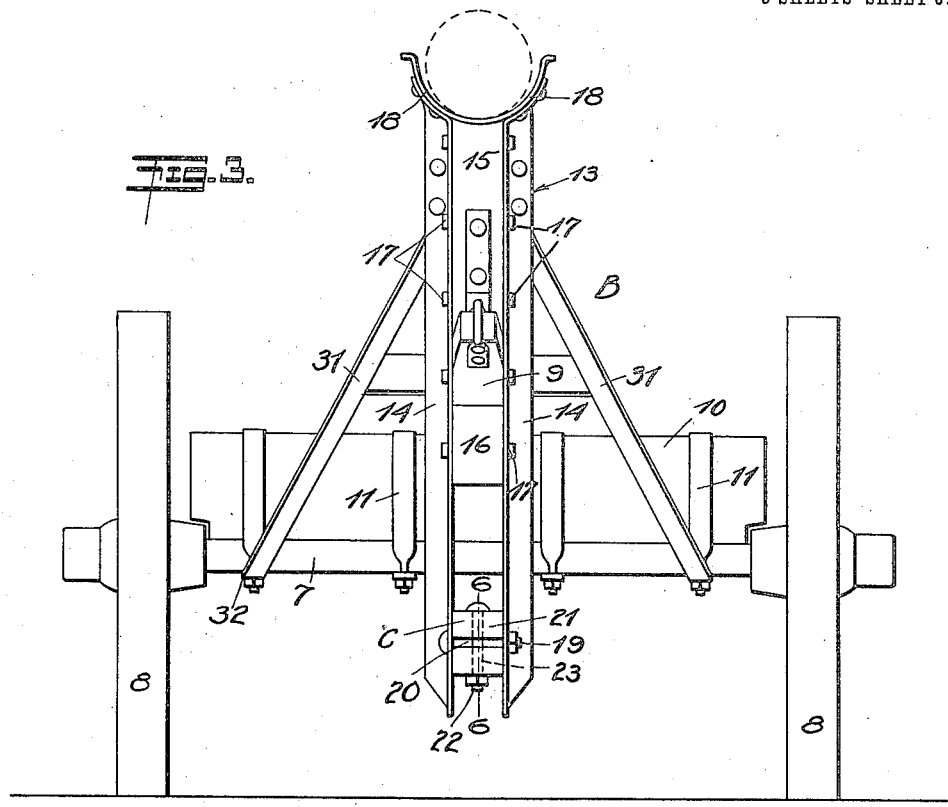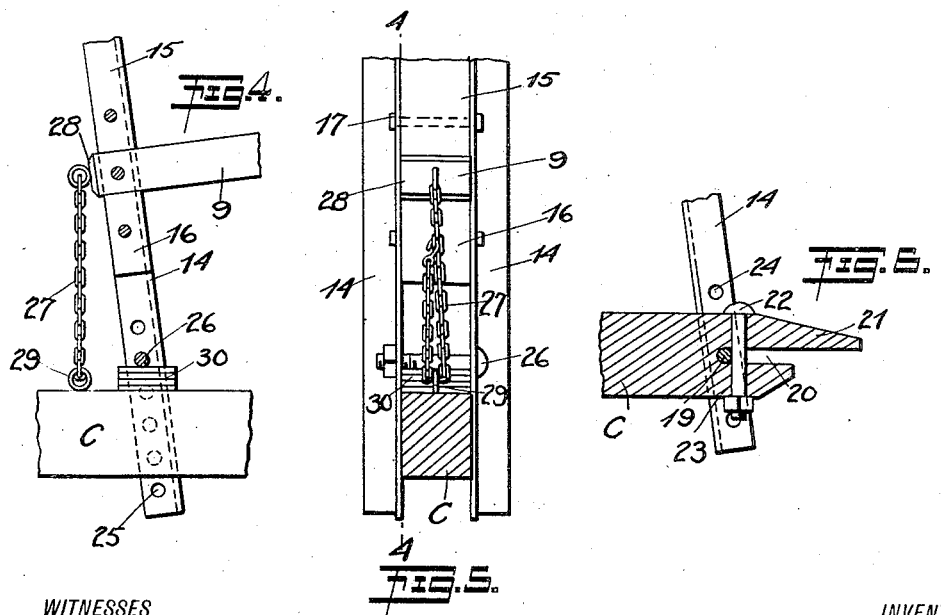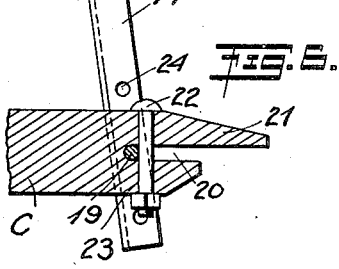

HAROLD CARMAN LEWIS, OF EAST ROCKAWAY, NEW YORK.

TREE-REMOVING MACHINE.

1,131,392.   Specification of Letters Patent.   Patented Mar. 9, 1915.

Application filed September 1, 1914. Serial No. 859,608.

*To all whom it may concern:*

Be it known that I, HAROLD C. LEWIS, a citizen of the United States, and a resident of East Rockaway, in the county of Nassau and State of New York, have invented a new and Improved Tree-Removing Machine, of which the following is a full, clear, and exact description.

This invention relates to a machine for use in the transplanting of large trees.

The invention has for its general objects to improve and simplify the construction and operation of tree transplanting machines whereby the operations of removing, transporting and placing a large tree can be expeditiously, safely and cheaply performed.

Another object of the invention is the provision of a machine of that type comprising a forecarriage or tow cart and a rear carriage or wheel-supported cradle which is detachably connected with the tow carriage through a central reach or perch, the cradle being of novel form, whereby the angle of the tree trunk can be readily adjusted for the proper distribution of the weight and the keeping of the tree branches or roots off the road surface.

A further object of the invention is the provision of novel and effective means for connecting the central reach of the machine with the rear carriage or cradle, whereby smooth riding of the tree is insured, while at the same time the cradle can be easily detached, and without endangering the lives of the workmen, when the tree is ready to be placed in the hole prepared to receive it.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is a longitudinal sectional view of a machine with a tree in position thereon for transportation; Fig. 2 is a sectional view of the rear carriage or cradle, showing a tree thereon which is about to be planted or is being raised; Fig. 3 is a rear view of the machine; Fig. 4 is a sectional view on the line 4—4, Fig. 5; Fig. 5 is a view of the left of Fig. 4; and Fig. 6 is a detail sectional view on the line 6—6, Fig. 3.

Referring to the drawings, A designates the forecarriage or tow cart of the machine, and B the rear carriage or cradle which is adapted to be connected with the front carriage by a central perch or reach C to form the complete machine. The front carriage comprises an axle 1 which has traction wheels 2, and on the axle bar 3 is a box or other seat 4, the forecarriage having the usual tongue 5 or other draft appliance. The front end of the reach C is connected by a king bolt 6 with the forecarriage, and this reach is intended to be removably and hingedly connected to the latter, whereas it is adapted to be fixedly and detachably connected with the rear carriage or cradle B, so that the latter can be used separately for uprooting or placing a tree. The rear carriage B comprises an axle 7 on which are traction wheels 8, and extending transversely of the axle and disposed over the same is a pole or tongue 9 which rests on the axle bar 10 that is fastened by clips or other means 11 to the axle 7. This tongue has fastened thereto upwardly-extending tree-carrying elements 12 and 13 which are spaced apart respectively forwardly and rearwardly of the axle, and these members extend upwardly and downwardly from the pole 9. These tree-carrying members each comprise a pair of vertically disposed angle or other bars 14 which are spaced apart to receive between them the pole 9, and filler pieces 15 and 16 are disposed between the angle bars 14, respectively above and below the pole 9, the filler pieces and angle bars being fastened together by bolts 17. The tops of the angle bars 14 have fastened thereto semicircular seats or saddles 18 which support the tree trunk. The lower ends of each pair of angle irons straddle the reach C, and it is through these angle irons that the reach is connected in a special manner with the rear carriage. The rear pair of angle irons are provided with a horizontally extending pin or bolt 19 which is adapted to engage in a horizontal recess 20 in the rear end of the reach C, such end having an extension 21 above the recess 20 to form a lip for facilitating the guiding of the pin 19 into the mouth or recess 20. A vertically extending pin or bolt 22 is disposed in an opening 23 and extends across the mouth 20 so as to form a keeper engaging behind the pin 19 to thereby connect the rear end of the reach with the rear tree-carrying element or standard 13 of the cradle. By taking the pin or keeper 22 out of the reach the latter becomes detached from the rear carriage as the forecarriage is drawn forwardly. The pin 19 is adjustably arranged by being insertible in any one of a series of openings 24 in the rear set of angle bars 14.

The set of angle bars 14 of the front tree-carrying element or standard 12 are each provided with a series of openings 25 so disposed that the openings of one bar are in alinement with those of the other, so that a pin or bolt 26 can be inserted in any two opposite openings, whereby the bolt or pin will be disposed over the reach C, and thus the front tree-carrying element 12 will be supported on the reach. To prevent up and down movement of the cradle with respect to the reach a chain or equivalent device 27 is connected with the extremity 28 of the pole 9 and with a ring or equivalent device 29 fastened to the reach, and to obtain the proper adjustment it may be necessary to insert blocks 30 between the bolt 26 and top surface of the reach C, as shown in Fig. 4. The tree-carrying elements 12 and 13 are laterally braced by means of braces 31 which are connected to the upper portions of the tree-carrying elements, and extend downwardly and outwardly therefrom and connect with the axle 7 at 32 near the ends thereof. It will thus be seen that the cradle comprises a rigid frame mounted on the axle 7, which latter is provided with wheels, and the cradle is adapted to be adjusted about the axle as a center in order to throw the tree-carrying elements or standards in any desired angle for proper disposition of the weight of the tree, the angle being maintained by the adjustment provided by the novel connecting means between the lower ends of the tree-carrying elements and reach C.

In the operation of transplanting a tree, the earth is removed from the roots from a suitable point remote from the tree, until a point is reached within a few feet of the trunk, where a considerable ball of earth is left, so as to adhere to the roots when the tree is raised. The rear carriage or cradle B is detached from the reach and placed in such a position that the tree-carrying elements or standards 12 and 13 will be approximately horizontal with the seats or saddles 18 in contact with the trunk of the tree, the pole 9 of the cradle extending upwardly. Chains or equivalent means 33 are placed around the trunk of the tree at points to the front and rear of the standard 13, and these chains are connected by turnbuckles or equivalent devices 34 to the pole 9, whereby the tree can be firmly clamped to the saddles 18. A block and tackle 35 is then connected with the trunk of the tree at a point quite high, and also connected with a stake or equivalent anchor 36, and by means of this block and tackle the tree is pulled over from a standing to an approximately horizontal position, the frame of the cradle turning on the axle 7 as a center. This operation of raising the tree is shown in Fig. 2, but this figure also represents the operation of placing a tree in a hole where it is to be transplanted. After the tree is approximately in a horizontal position the forecarriage with its reach is backed up to the cradle so that the reach C can be connected with the latter in a manner shown in Fig. 1. It will be noted that the roots and ball of earth D of the tree E constitute the greatest weight, and this portion of the tree is located between the front and rear carriages, and as a result of this manner of balancing the load the tree can be transported smoothly and without liability to damage. When the point where the tree is to be transplanted is reached, the machine is so driven that the wheels of the rear carriage will stop at one side of the hole where the tree is to be planted. The block and tackle 35 is then applied, as shown in Fig. 2, so that the reach can be disconnected from the rear carriage in a manner to properly control the tree. All that is necessary to detach the reach is to disconnect the chain 27 and remove the pin 22, and then the horses attached to the forecarriage are driven forwardly so as to draw the reach in the same direction. In this manner the reach is drawn out of engagement with the pin 19, and then drops on the ground, and after the reach has moved far enough away from the hole that is to receive the tree, the latter can be allowed to swing and drop into place by the slacking out of the block and tackle device 35, since the ball of earth is the dominant weight, and hence causes the cradle to turn on the axle 7 as the block and tackle device is paid out. After the tree is set up the cradle is detached from the tree and earth is now filled in around the roots. It will thus be seen that the operations of uprooting, transporting and resetting a tree can be carried on with ease, despatch, safety and reliability.

Having thus described my invention, I claim as new and desire to secure by Letters Patent:

1. A tree transplanting machine comprising a forecarriage, a reach, a rear carriage forming a tree-carrying cradle and embodying an axle, a frame mounted on the axle, and detachable connections between the frame and reach at points to the front and rear of the axle for adjusting the angle of the tree trunk carried by the cradle.

2. A tree removing machine comprising a carriage, a reach connected therewith, a rear carriage forming a tree-holding cradle, said cradle consisting of an axle, a frame mounted thereon and including front and rear standards, saddles on the upper ends of the standards to form seats in which the trunk of the tree rests, a detachable connection between the rear end of the reach and the rear standard, and an adjustable device arranged on the front standard to bear on the reach.

3. A tree removing machine comprising a carriage, a reach connected therewith, a rear carriage forming a tree-holding cradle, said cradle consisting of an axle, a frame mounted thereon and including front and rear standards, saddles on the upper ends of the standards to form seats in which the trunk of the tree rests, a detachable connection between the rear end of the reach and the rear standard, an adjustable device arranged on the front standard to bear on the reach, and an element detachably connecting the front portion of the frame with the reach.

4. In a tree removing machine, the combination of a forecarriage, a reach connected therewith, a rear carriage including a wheel-supported frame having front and rear standards composed of bars spaced apart to receive between them the said reach, and means for detachably connecting the lower ends of the said bars with the reach.

5. In a tree removing machine, the combination of a forecarriage, a reach connected therewith, a rear carriage including a wheel-supported frame having front and rear standards composed of bars spaced apart to receive between them the said reach, the rear end of the reach having a horizontal recess, a horizontal pin in one set of bars and arranged to enter the said recess, a removable pin on the reach and extending across the recess to form a keeper to engage the first-mentioned pin to detachably connect the reach with the cradle, and a pin adjustably mounted on the front set of bars, whereby the front of the cradle and the load sustained thereby are supported by the reach.

6. In a tree removing machine, the combination of a forecarriage, a reach connected therewith, a rear carriage including a wheel-supported frame having front and rear standards composed of bars spaced apart to receive between them the said reach, the rear end of the reach having a horizontal recess, a horizontal pinion one set of bars and arranged to enter the said recess, a removable pin on the reach and extending across the recess to form a keeper to engage the first-mentioned pin to detachably connect the reach with the cradle, a pin adjustably mounted on the front set of bars, whereby the front of the cradle and the load sustained thereby are supported by the reach, and an element detachably connecting the front of the frame of the cradle with the reach.

7. In a tree removing machine, a tree-carrying cradle comprising an axle, wheels thereon, a pole extending across and rigidly connected with the axle, front and rear pairs of bars fastened to the pole at opposite sides thereof, with the lower ends of the bars spaced apart, saddles on the upper ends of the bars to receive the trunk of the tree, and means connected with the pole for clamping the tree in the saddles.

8. In a tree removing machine, a tree-carrying cradle comprising an axle, a wheel on the axle, and a frame on the axle, said frame consisting of a centrally-disposed pole, standards rigidly connected therewith at points to the front and rear of the axle, means on the upper ends of the poles for receiving the trunk of a tree, in combination with a reach separately and adjustably connected at the lower ends of the standards, and a forecarriage connected with the reach.

In testimony whereof I have signed my name to this specification in the presence of two subscribing witnesses.

HAROLD CARMAN LEWIS.

Witnesses:
CHATTEN BRADWAY,
GEORGE H. EMSLIE.